US011252677B2

United States Patent
Plechinger et al.

(10) Patent No.: US 11,252,677 B2
(45) Date of Patent: Feb. 15, 2022

(54) METHOD, COMMUNICATION MODULE, VEHICLE, SYSTEM, AND COMPUTER PROGRAM FOR AUTHENTICATING A MOBILE RADIO DEVICE FOR A LOCATION-SPECIFIC FUNCTION OF A VEHICLE

(71) Applicant: AUDI AG, Ingolstadt (DE)

(72) Inventors: Jörg Plechinger, Munich (DE); Christoph Voigt, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/048,507

(22) PCT Filed: Jan. 22, 2019

(86) PCT No.: PCT/EP2019/051440
§ 371 (c)(1),
(2) Date: Oct. 16, 2020

(87) PCT Pub. No.: WO2019/201485
PCT Pub. Date: Oct. 24, 2019

(65) Prior Publication Data
US 2021/0211990 A1 Jul. 8, 2021

(30) Foreign Application Priority Data
Apr. 20, 2018 (DE) .................... 10 2018 206 070.3

(51) Int. Cl.
*H04W 52/28* (2009.01)
*H04W 4/40* (2018.01)
(Continued)

(52) U.S. Cl.
CPC .......... *H04W 52/283* (2013.01); *H04W 4/023* (2013.01); *H04W 4/40* (2018.02);
(Continued)

(58) Field of Classification Search
CPC ........... H04W 4/02; H04W 4/40; H04W 4/80; H04W 12/06; H04W 12/63; H04W 12/08; H04W 48/02; H04W 52/0254
See application file for complete search history.

(56) References Cited

U.S. PATENT DOCUMENTS

| 10,055,917 B2 | 8/2018 | Spahl et al. |
| 10,455,625 B2 | 10/2019 | Simsek |

(Continued)

FOREIGN PATENT DOCUMENTS

| DE | 10253915 A1 | 5/2003 |
| DE | 102014224999 A1 | 6/2015 |

(Continued)

OTHER PUBLICATIONS

International Preliminary Report on Patentability directed to related International Patent Application No. PCT/EP2019/051440, completed Aug. 5, 2020, with attached English-language translation; 16 pages.

(Continued)

*Primary Examiner* — Keith Ferguson
(74) *Attorney, Agent, or Firm* — Sterne, Kessler, Goldstein & Fox P.L.L.C.

(57) ABSTRACT

Embodiments create the present method, communication module, vehicle, system, and computer program for authenticating a mobile radio device for a location-specific function of a vehicle. The vehicle comprises a transmitter designed for transmitting mobile radio signals in a mobile radio system and a receiver designed for receiving mobile radio signals in a mobile radio system. Furthermore, a control module designed for controlling the transmitter and the receiver is provided, said control module being coupled to the transmitter and the receiver, and the control module is additionally designed to convert the transmitter from a first mode to a second mode when the vehicle is parked. The (Continued)

transmitter consumes less energy in the second mode than in the first mode. Furthermore, a received mobile radio signal of the mobile radio device is evaluated, said signal comprising information on the identity of the mobile radio device. Finally, an authentication of the mobile radio device is carried out on the basis of the mobile radio signal, wherein the mobile radio device is authorized to use at least one location-specific function of the vehicle after a successful authentication.

14 Claims, 4 Drawing Sheets

(51) Int. Cl.
　　　*H04W 12/63* 　　(2021.01)
　　　*H04W 12/033* 　(2021.01)
　　　*H04W 4/02* 　　(2018.01)
　　　*H04W 12/06* 　　(2021.01)
　　　*H04W 52/02* 　　(2009.01)

(52) U.S. Cl.
　　　CPC ......... *H04W 12/033* (2021.01); *H04W 12/06* (2013.01); *H04W 12/63* (2021.01); *H04W 52/0254* (2013.01)

(56) References Cited

U.S. PATENT DOCUMENTS

| | | |
|---|---|---|
| 2003/0095040 A1 | 5/2003 | Shimomura |
| 2010/0114488 A1* | 5/2010 | Khamharn ............ B60R 25/102 701/300 |
| 2014/0081848 A1 | 3/2014 | Leopold et al. |
| 2014/0169564 A1 | 6/2014 | Gautama et al. |
| 2015/0304817 A1 | 10/2015 | Yorifuji |
| 2017/0282856 A1* | 10/2017 | Riedel .................... B60R 25/24 |
| 2017/0327082 A1 | 11/2017 | Kamhi et al. |
| 2019/0005445 A1* | 1/2019 | Bahrainwala .... G06Q 10/08355 |

FOREIGN PATENT DOCUMENTS

| | | |
|---|---|---|
| DE | 102016000546 A1 | 8/2016 |
| DE | 102016108726 A1 | 11/2016 |
| DE | 102013225742 B4 | 3/2017 |
| DE | 102015219365 A1 | 4/2017 |
| DE | 102017110251 A1 | 11/2017 |
| EP | 2709051 A1 | 3/2014 |
| EP | 3276991 A2 | 1/2018 |
| SE | 1550101 A1 | 8/2016 |
| WO | WO 2015/122825 A1 | 8/2015 |

OTHER PUBLICATIONS

International Search Report and Written Opinion of the International Searching Authority directed to related International Patent Application No. PCT/EP2019/051440, dated May 3, 2019, with attached English-lauguage translation; 21 pages.

\* cited by examiner

METHOD, COMMUNICATION MODULE, VEHICLE, SYSTEM, AND COMPUTER PROGRAM FOR AUTHENTICATING A MOBILE RADIO DEVICE FOR A LOCATION-SPECIFIC FUNCTION OF A VEHICLE

TECHNICAL FIELD

Embodiments relate to a method, communication module, vehicle, system, and computer program for authenticating a mobile radio device for a location-specific function of a vehicle. Location-specific functions of the vehicle are used to make it easier for the driver to operate before arriving at or after leaving the vehicle using supporting vehicle responses.

BACKGROUND

It is known to facilitate the remote control and handling of a vehicle for the driver before arriving at or after leaving the vehicle using supporting vehicle responses. For this purpose, control units are used in the vehicles that register the approach or departure of the driver. These control units must be optimized in terms of power consumption, since they must be in operation at least semi-permanently due to the unpredictability of the driver approaching. The operation of these control units takes place with radio transceivers, which can be designed as motor vehicle keys or can assume a variety of other embodiments. A radio transceiver can thus also be designed as a commercially available cellular mobile radio device on which a manufacturer-specific application is executed.

Implementations can be based on Bluetooth low energy technology, for example. Other radio standards with a limited range can be used, which can be designed, for example, in accordance with the WLAN (Wireless LAN), WiFi, or NFC (Near Field Communication) standard. The established cellular mobile radio can also be used with its commercially available mobile devices.

DE 10 2016 108 726 A1 discloses first and second movement data which represent the movement of a first and a second wearable portable apparatus during a first period of time. The first and second wearable portable apparatuses are associated with first and second users, respectively. A position of the first user relative to the second user in the vehicle is determined based at least in part on the comparison of the movement data.

From DE 10 2013 225 742 A1, a wireless communication device (or terminal device) is known, as well as a vehicle having a central module, and a server providing a key. The server providing the key is communicatively coupled to the wireless communication device and the central module via wireless connections.

DE 10 2017 110 251 A1 discloses a system for implementation in an autonomous vehicle, which system comprises a hardware-based processing unit, a man-machine interface, and a non-transitory storage device that contains a registration module. When executed by the hardware-based processing unit, the system performs passenger registration functions.

EP 2 729 904 B1 discloses that personalization of data and, as a result, of settings in a motor vehicle takes place with the aid of a central data processing device. Said device is aware of the positions of a motor vehicle or a plurality of motor vehicles and transmits these positions to a mobile communication device, which compares the transmitted positions with its own.

DE 10 2016 000 546 A1 teaches methods and apparatuses for providing access to a set of functions in a multi-person vehicle for a user of a mobile device.

EP 2 709 051 A1 teaches a method for electronically processing a traffic offense of a vehicle which has an onboard unit having a transceiver, an input device, and an output device.

However, it is necessary to use separate control units in the vehicle for this function, which can additionally be connected with the installation of associated communication antennas. In addition to the direct costs for the components, there are also disadvantages due to the corresponding arrangement of the components in the vehicle, their supply, and control.

DETAILED DESCRIPTION

Figure 1:
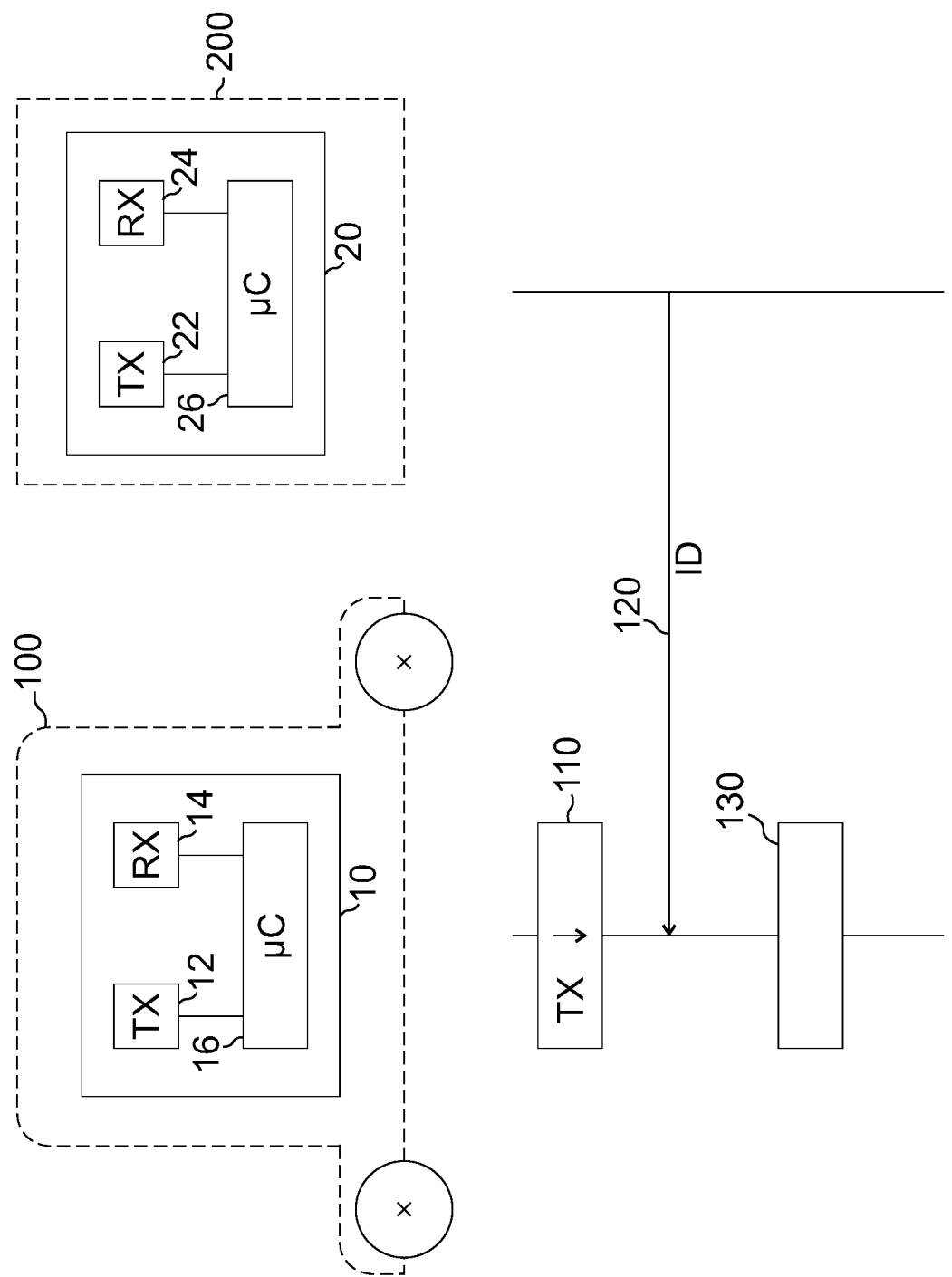
FIG. 1 shows a system with an embodiment of a mobile radio device, an embodiment of a communication module and associated method steps.

There is therefore a need to improve the remote control of a vehicle by a driver approaching or departing from the vehicle. The subject matter of the pending independent claims take this need into consideration.

Embodiments are based on the core idea that the desired functionality of the remote control is additionally taken over by a device which is already present in the vehicle. For this purpose, the device is to be used largely in its usual function in order to require as few additional components as possible. On the other hand, a very low power consumption must be ensured, since the remote control is operated when the vehicle is parked, in which the vehicle battery is only discharged. A solution to this problem is proposed by an expanded use of vehicle-to-everything (V2X) devices which are widespread in new vehicles and have so far only been used in moving vehicles. The extension relates to use in the parked vehicle, with the high power-consuming transmitter in particular being switched off at least for longer periods and only the receiver and minimal additional hardware remaining in operation at least semi-permanently. Only after signals of an identity of a portable device of the driver have been successfully authenticated, further components of the C-V2X device are put into operation, including the transmitter.

Embodiments relate to a communication module for authenticating a mobile radio device for a location-specific function of a vehicle. It comprises a transmitter designed for transmitting mobile radio signals in a mobile radio system. It further comprises a receiver designed for receiving mobile radio signals in a mobile radio system. A control module is also provided, which is coupled to the transmitter and the receiver and is designed for controlling the transmitter and the receiver. When the vehicle is parked, the control module is also designed to convert the transmitter from a first mode to a second mode, the transmitter consuming less energy in the second mode than in the first mode. The control module is also designed to evaluate a received mobile radio signal from the mobile radio device, which comprises information about an identity of the mobile radio device. The control module is also designed to carry out an authentication of the mobile radio device on the basis of the mobile radio signal, wherein the mobile radio device is authorized to use at least one location-specific function of the vehicle after a successful authentication.

In this way, an energy-efficient reception and signal processing operation is advantageously made possible in the case of a device having a transmitter with high power consumption.

In embodiments, the control module of the communication module can be designed to convert the transmitter from the second mode to the first mode after successful authentication.

The authentication is advantageously carried out with minimal hardware expenditure, which corresponds to minimal power consumption.

In some embodiments, the communication module will assign the at least one location-specific function to at least one or more elements of the group of welcome light, welcome tone, goodbye light, goodbye tone, access authorization, door opening, and provision of reporting information.

In this way both local responses of the vehicle and messages to the driver's mobile radio device can advantageously be initiated.

In further embodiments, when the vehicle is not parked, the control module of the communication module can evaluate vehicle-specific and traffic-specific information from other entities and/or initiate the transmission of its own corresponding information.

The transmitter and receiver can thus advantageously be used for a plurality of applications, in particular for applications in both operating modes (parked and non-parked vehicle).

In some embodiments, the control module of the communication module is designed to transmit and receive the vehicle-specific and traffic-specific information according to the vehicle-to-everything (V2X) standard of the 3rd Generation Partnership Project (3GPP).

A broad application of the device can thus advantageously be ensured since the spread of this standard is increasing rapidly. Accordingly, the device will be installed regularly in vehicles. The claimed modification provides an additional benefit with comparatively little additional effort.

In embodiments, the control module of the communication module can be designed to convert the transmitter from the second mode to the first mode when the vehicle is not parked.

In this way it can advantageously be ensured that the communication module is completely ready for its previous use in the moving vehicle.

Furthermore, in embodiments, the control module of the communication module can at least temporarily switch the transmitter to the second mode or switch the transmitter permanently to the second mode when parking the vehicle.

In this way, a high level of flexibility in the use of the transmitter can advantageously be achieved while maintaining the minimum power consumption.

In some embodiments, the control module of the communication module is designed to ascertain a distance between the vehicle and the mobile radio device before performing a location-specific function of the vehicle, and the location-specific function of the vehicle is only granted when the vehicle and the mobile device fall below a specified distance.

This advantageously ensures that the location-specific function can only be activated when the driver is sufficiently close to the vehicle. Since the location-specific functions can also include opening the doors, this also prevents theft.

Furthermore, in embodiments, the control module of the communication module can be designed to receive the mobile radio signal in accordance with a vehicle-to-everything (V2X) standard.

The driver's mobile radio device can thus advantageously be designed to participate in the V2X method and use the transceivers available locally for this purpose.

In some embodiments, the control module of the communication module is designed to use point-to-point transmission for the mobile radio signal between the communication module and the mobile radio device.

In this way, the confidentiality of the information exchanged can advantageously be increased while at the same time using the frequency resources more efficiently.

In embodiments, the control module of the communication module can be designed to transfer the information about the identity of the mobile radio device based on the vehicle-to-person (V2P) standard.

Commercially available mobile devices can advantageously be used for communication with the communication module, since it is to be expected that these commercially available mobile devices are regularly equipped with the V2P function in order to be easily recognizable in road traffic using the higher-level V2X method. This is especially true for cyclists and pedestrians.

In embodiments, the control module of the communication module can be designed to detect a parked state of the vehicle based on information relating to a lock, an empty driver's seat, a switched off ignition, or a standstill of the vehicle.

In this way, the state of the parked vehicle can advantageously be recognized reliably and inexpensively since the corresponding sensors are already present in the vehicle.

In some embodiments, the control module of the communication module is designed to update stored data for authentication via a geographically remote central unit.

In this way, the security of the authentication and possibly the encrypted data transmission can advantageously be increased, in that the associated keys and other information can be exchanged if necessary.

Embodiments also relate to a mobile radio device that is designed to communicate with a communication module of a parked vehicle. It comprises a transmitter, which is designed for transmitting mobile radio signals in a mobile radio system, and a receiver, which is designed for receiving mobile radio signals in a mobile radio system. It further comprises a control module which is coupled to the transmitter and the receiver and is designed for controlling the transmitter and the receiver. The control module is also designed for transmitting a broadcast signal to the communication module with information about an identity of the mobile radio device, the information about the identity of the mobile radio device being provided for authentication of the mobile radio device by the communication module. Furthermore, the control module is designed for receiving a signal from the communication module in the event of positive authentication of the mobile radio device with information from at least one location-specific function of the vehicle.

The mobile radio device can advantageously offer the driver the location-specific function of the vehicle for execution, for example let it sound the horn and/or signal.

In some embodiments, the control module of the mobile radio device is designed to derive a geographic position of the vehicle from the information received from at least one location-specific function of the vehicle.

The mobile radio device can thus advantageously show the driver the way to the vehicle, for example using navigation software.

In embodiments, the control module of the mobile radio device can be designed to also extract a request for the transmission of access authorization data to the communication module from the information received from at least one location-specific function of the vehicle.

In this way, presets can advantageously be transmitted to the vehicle, for example not opening the door beforehand in unsafe areas.

One embodiment relates to a mobile radio station comprising a mobile radio device.

The mobile station can advantageously be designed as a manufacturer-specific mobile radio device which is characterized by a specific shape or design and additional functionality. It can be designed as a vehicle key, for example.

A further embodiment relates to a vehicle that comprises a communication module.

In this way, the new function can advantageously be provided for the vehicle at low additional costs, since, among other things, vehicle components such as power supply and cladding of the communication module can be omitted.

A further embodiment relates to a system comprising a communication module and a mobile radio device or a mobile radio station.

Yet another embodiment relates to a method for a communication module for authenticating a mobile radio device for a location-specific function of a parked vehicle. This comprises the following steps: converting a transmitter of the communication module from a first mode to a second mode, the transmitter consuming less energy in the second mode than in the first mode. It further comprises receiving a mobile radio signal from the mobile radio device which comprises information about an identity of the mobile radio device. In addition, it comprises an authentication of the mobile radio device on the basis of the mobile radio signal.

In this way, an energy-efficient reception and signal processing operation is advantageously made possible in the case of a device having a transmitter with high power consumption.

An additional embodiment relates to a method for a mobile radio device which is designed for authenticating the mobile radio device in a communication module for a location-specific function of a parked vehicle. It consists of the following steps: transmitting a signal to the communication module for the parked vehicle with information about an identity of the mobile radio device, the information about the identity of the mobile radio device being provided for authentication of the mobile radio device by the communication module. It further comprises receiving a signal from the communication module in the event of positive authentication of the mobile radio device with information from at least one location-specific function of the parked vehicle.

The mobile radio device can advantageously offer the driver the location-specific function of the vehicle for execution, for example let it sound the horn and/or signal.

Further additional embodiments include a computer program with a program code for carrying out at least one of the methods mentioned when the program code is executed on a computer, a processor, a control module, or a programmable hardware component.

BRIEF DESCRIPTION OF THE DRAWING

Embodiments are explained in more detail below with reference to the accompanying drawings.

FIG. 1 shows a system with an embodiment of a mobile radio device, an embodiment of a communication module and associated method steps.

Figure 2:
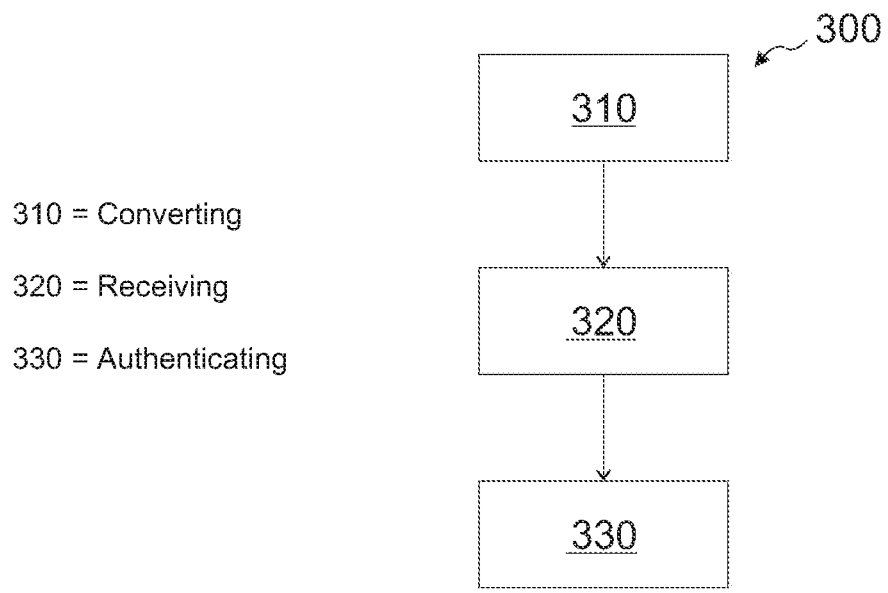
FIG. 2 shows a block diagram of an embodiment of a method for a communication module.

FIG. 2 shows a block diagram of an embodiment of a method for a communication module.

Figure 3:
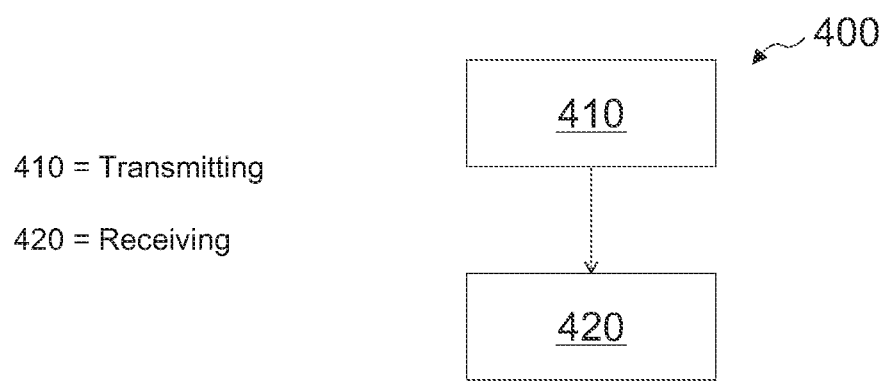
FIG. 3 shows a block diagram of an embodiment of a method for a mobile radio device.

FIG. 3 shows a block diagram of an embodiment of a method for a mobile radio device.

Figure 4:
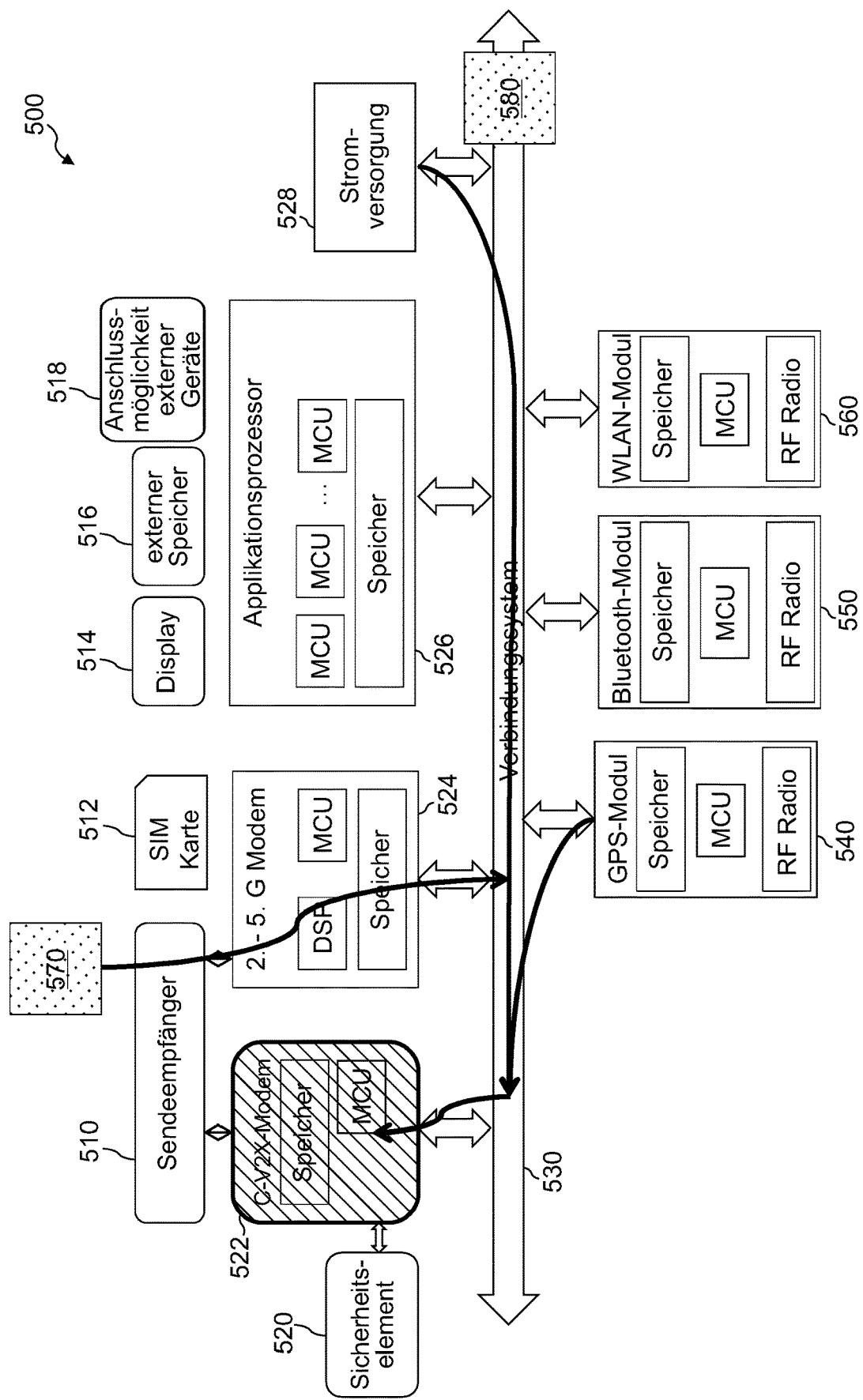
FIG. 4 shows a block diagram of an embodiment of a communication device for the C-V2X standard (cellular vehicle-to-everything) operation.

FIG. 4 shows a block diagram of an embodiment of a communication device for the C-V2X standard (cellular vehicle-to-everything) operation.

Figure 5:
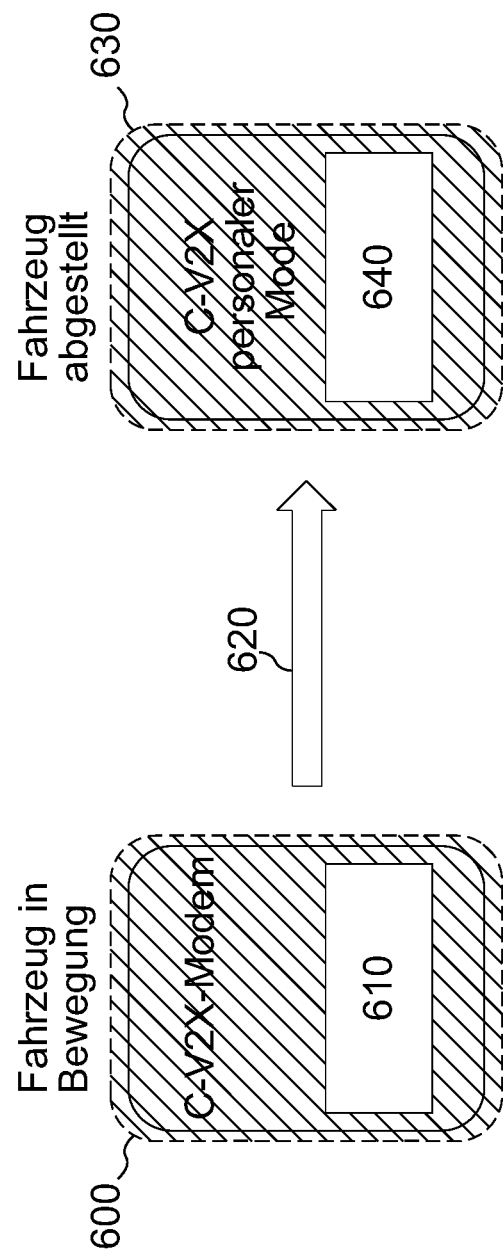
FIG. 5 shows a more detailed block diagram of an embodiment of the C-V2X modem.

FIG. 5 shows a more detailed block diagram of an embodiment of the C-V2X modem.

DETAILED DESCRIPTION

Embodiments relate to a communication module, a vehicle, a system, a method, and a computer program for authenticating a mobile radio device for a location-specific function of a vehicle. Different embodiments will now be described in more detail with reference to the accompanying drawings. In the figures, the thickness dimensions of lines, layers, and/or regions may be exaggerated for the sake of clarity.

In the following description of the accompanying figures, which only show a few embodiments, the same reference signs can designate the same or comparable components. Furthermore, summarizing reference signs can be used for components and objects that appear a plurality of times in an embodiment or in a drawing, but are described jointly with regard to one or more features. Components or objects that are described with the same or summarizing reference signs can be identical with regard to individual, a plurality of or all features, for example their dimensions, but possibly also different, unless the description explicitly or implicitly results in something else.

Although embodiments can be modified and changed in different ways, embodiments are shown in the figures by way of example and are described in detail herein. It should be made clear, however, that the intention is not to restrict embodiments to the forms disclosed in each case, but rather that embodiments are intended to cover all functional and/or structural modifications, equivalents, and alternatives. The same reference signs denote the same or similar elements throughout the description of the figures.

Note that an element referred to as being "connected" or "coupled" to another element may be directly connected or coupled to the other element, or that intervening elements may be present. Conversely, when an element is said to be "directly connected" or "directly coupled" to another element, there are no intervening elements. Other terms used to describe the relationship between elements should be interpreted in a similar way (for example, "between" versus "directly between," "adjacent" versus "directly adjacent," etc.).

The terminology used herein is only used to describe particular embodiments and is not intended to limit the embodiments. As used herein, the singular forms "a," "an," and "the" are intended to include the plural forms as well, unless the context clearly indicates otherwise. It should also be made clear that the expressions such as, for example, "includes," "including," "has," "comprises," "comprising," and/or "having", as used herein, refer to the presence of named features, integers, steps, workflows, elements and/or components, but do not exclude the presence or addition of one or more characteristics, integers, steps, workflows, elements, components, and/or groups thereof.

Unless otherwise defined, all terms (including technical and scientific terms) used herein have the same meaning as assigned to them by an average person skilled in the art to which art the embodiments belong. It should also be clarified that terms, for example those defined in commonly used dictionaries, are to be interpreted as having the meaning that is consistent with their meaning in the context of the relevant art, and are not to be interpreted in an idealized or overly formal sense, as long as this is not expressly defined herein.

The components described here and in the following are described as "designed to" or "configured to" perform or fulfill a specific function, these terms being used synonymously and being interchangeable with one another. Such a component is able to perform the function described because, for example, appropriate software is available or held in a memory. For example, a control module that is configured or designed to control a transceiver module and is implemented in programmable hardware is to be interpreted to the effect that corresponding control software is available for controlling the transceiver module.

The idea of embodiments relates to an apparatus and a process for authentication, identification, and subsequent activation of vehicle functions via a novel direct communication. In previous applications, a vehicle "awakens," e.g., when the driver approaches, via Bluetooth Low Energy technology. Technically, this is a very good way, but it is associated with quite high costs for the installation of a separate Bluetooth-low-energy control unit with the associated communication antennas. In the future, the implementation can be done much more cost-effectively using direct communication technology. This direct communication is currently planned mainly for the implementation of traffic safety functions for moving traffic. The direct communication can for example be designed as the already mentioned C-V2X method. With the help of the additions described in this idea, this communication can also be used when the vehicle is stationary.

The following embodiments implement this idea in a variety of ways.

FIG. 1 shows an embodiment of a communication module 10 for authenticating a mobile radio device 20 for a location-specific function of a vehicle 100. The vehicle comprises a transmitter 12 designed for transmitting mobile radio signals in a mobile radio system, a receiver 14 for receiving mobile radio signals in a mobile radio system, a control module 16 designed for controlling the transmitter 12, and the receiver 14, said control module being coupled to the transmitter 12 and the receiver 14. When the vehicle 100 is parked, the control module 16 is also designed for converting the transmitter 12 from a first mode to a second mode, the transmitter 12 consuming less energy in the second mode than in the first mode. The control module 16 is also designed to evaluate a received mobile radio signal of the mobile radio device 20, said signal comprising information on the identity of the mobile radio device 20. The control module 16 is also designed to carry out an authentication of the mobile radio device 20 on the basis of the mobile radio signal, wherein the mobile radio device 20 is authorized to use at least one location-specific function of the vehicle 100 after a successful authentication.

In embodiments, the communication module 10 can be arranged in a vehicle 100.

FIG. 1 also shows an embodiment of a mobile radio device 20 which is designed for communication with a communication module 10 of a parked vehicle 100. The mobile device comprises a transmitter 22, which is designed for transmitting mobile radio signals in a mobile radio system, and a receiver 24, which is designed for receiving mobile radio signals in a mobile radio system. The mobile device further comprises a control module 26, which is coupled to the transmitter 22 and the receiver 24 and is designed for controlling the transmitter 22 and the receiver 24. The control module 26 is also designed for transmitting a broadcast signal to the communication module with information about an identity of the mobile radio device 20, wherein the information about the identity of the mobile radio device 20 is provided for authentication of the mobile radio device 20 by the communication module 10. Finally, the control module 26 is designed for receiving a signal from the communication module 10 in the case of positive authentication of the mobile radio device 20 with information from at least one location-specific function of the vehicle.

In embodiments, a mobile radio station 200 can comprise a mobile radio device 20. The mobile radio station can be designed with a manufacturer-specific shape or design and additional functions. In embodiments, the shape can be designed as a mechanical vehicle key.

One embodiment shows a system comprising a communication module 10 and a mobile radio device or a mobile radio station 200.

In embodiments, transmitters 12, 22 may include typical transmitting components, such as one or more low-noise amplifiers (LNAs), one or more power amplifiers (PAs), one or more duplexers, one or more diplexers, one or more filters or filter circuits, one or more converters, one or more mixers, appropriately adapted radio frequency components etc. The antennas can correspond to any transmitting antenna, like horn antennas, dipole antennas, patch antennas, sector antennas etc. The antennas can be arranged in a defined geometric arrangement, such as a uniform arrangement, a linear arrangement, a circular arrangement, a triangular arrangement, a uniform field, a field arrangement, or combinations of these arrangements.

In embodiments, receivers 14, 24 can include typical reception components such as one or more low-noise amplifiers (LNAs), one or more duplexers, one or more diplexers, one or more filters or filter circuits, one or more converters, one or more mixers, appropriately adapted radio frequency components etc. In embodiments, the associated antennas can correspond to the antennas of the transmitter.

In embodiments, a transmitter, a receiver, a mobile radio device, or a mobile device is adapted to a radio system, a mobile radio system or mobile communication system, in the sense that it has the components required for communication in this regard, such as antennas, filters, amplifiers, one or more processors, displays, etc. Such systems comprise, for example, Bluetooth, Wireless Local Area Network (WLAN), WirelessFidelity (WiFi), mobile radio, etc. For example, mobile radio systems that are standardized by the corresponding standardization bodies, such as of the 3rd Generation Partnership Project (3GPP) group, can be taken into consideration. For example, these include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as the Universal Mobile Telecommunication System (UMTS), Long Term Evolution (LTE) or LTE-Advanced (LTE-A), Fifth generation system (5G) or mobile radio systems of other standards, such as, for example, Worldwide Interoperability for Microwave Access (WIMAX), IEEE802.16 or Wireless Local Area Network (WLAN), IEEE802.11, and generally a system that runs on a Time Division Multiple Access (TDMA), Frequency Division Multiple Access (FDMA), Code Division Multiple Access (CDMA), Orthogonal Frequency Division Multiple Access (OFDMA), or another technology or multiple access method. In the following, the terms mobile radio system, mobile radio network, mobile communication system, and cellular radio network are used synonymously.

In embodiments, the control module 16, 26 can correspond to any desired controller, or processor, or a programmable hardware component. For example, a control unit/module 16, 26 can also be implemented as software that is programmed for a corresponding hardware component. To this extent, a control module 16, 26 can be implemented as programmable hardware with appropriately adapted software. Any processors such as digital signal processors (DSPs) can be used. Embodiments are not restricted to a specific type of processor. Any number of processors or even a plurality of processors or microcontrollers for implementing the control module are conceivable. Implementations in integrated form with other control units are also conceivable, for example in a control unit for a vehicle, which additionally comprises one or more other functions. In embodiments, the method steps described herein can be carried out by the control modules 16, 26, or by, or by means of, the respective transmitters and receivers 12, 14, 22, 24. In this respect, the method steps described can be carried out by the device components. In embodiments, a control module 14, 24 can be realized by a processor, a central processing unit (CPU), a graphics processing unit (GPU), a computer, a computer system, an application specific integrated circuit (ASIC) an integrated circuit (IC), a system on chip (SOC), a programmable logic cell or a field programmable gate array (FPGA).

In embodiments, an authentication can be a proof (verification) of an alleged property of an entity, which can be implemented as a mobile radio device, for example. The alleged property is verified by a suitable operation, which in embodiments can be based on a secret key. The property can be an identity of the device. In embodiments, encryption can also be designed as the key-dependent conversion of data called "plain text" into "ciphertext" so that the plain text can only be retrieved from the ciphertext with the aid of a secret key. In this way, data can be protected against unauthorized access.

The system can be implemented as the sum of all components of the mobile radio system, which includes all functions and devices required for operation. For example, the system can be designed according to one of the 3GPP standards 2G-5G. In embodiments, mobile radio devices, which can also be referred to as mobile devices, can be designed as portable devices such as cell phones, tablets, laptops, portable computers, or as radio modules or the like. They can also be designed as a component of clothing, accessories, for example as glasses, as a surf stick or the like. Mobile devices, also known as handheld devices, can also be assigned to users if the mobile devices can also communicate the user data.

In the following, it is assumed that, in embodiments, a mobile radio system comprises at least one stationary transceiver in the sense of a base station which has a connection to the wired part of the mobile radio network. On the other hand, it is assumed that the mobile radio network comprises at least one mobile transceiver (mobile radio device, mobile radio terminal device), the term "mobile" here referring to the fact that this transceiver can be used to communicate via the air interface, i.e., wireless/cordless. Such a mobile transceiver can, for example, correspond to a portable telephone, a smartphone, a tablet computer, a portable computer, a vehicle, or a radio module that is not necessarily mobile in the sense that it actually moves in relation to its surroundings. The transceiver can also be stationary (e.g., relative to a motor vehicle), but communicate wirelessly with the mobile radio network. In this respect, the already mentioned base station can correspond to one of the standards mentioned above, for example a NodeB, an eNodeB, etc.

FIG. 1 also shows embodiments of a method for a communication module 10 for authenticating a mobile radio device 20 for a location-specific function of a vehicle 100. This comprises the following steps: When the vehicle 100 is parked, converting 110 a transmitter 12 of the communication module 10 from a first mode to a second mode, the transmitter 12 consuming less energy in the second mode than in the first mode. It further comprises receiving 120 a mobile radio signal from the mobile radio device 20 which contains information about an identity of the mobile radio device 20. An authentication 130 of the mobile radio device 20 then takes place on the basis of the mobile radio signal.

In addition, FIG. 1 shows at least partial embodiments with a method for a mobile radio device 20 which is designed for authenticating the mobile radio device 20 in a communication module 10 for a location-specific function of a parked vehicle 100. This includes transmitting 120 a signal to the communication module 10 for the parked vehicle with information about an identity of the mobile radio device 20, the information about the identity of the mobile radio device 20 being provided for the authentication of the mobile radio device 20 by the communication module 10. It further comprises receiving a signal, not shown in FIG. 1, from the communication module 10 given positive authentication of the mobile radio device 20 with information from at least one location-specific function of the parked vehicle 100.

In addition to authentication, in embodiments, the transmission via secure connections (encryption, also known as encryption), which is already present in the 3GPP standard, can also allow the communication of sensitive content via a radio interface. For this purpose, the authentication system of direct communication can be used in embodiments and expanded with the option of receiving temporary and locally limited certificates for securing communication via the network operator. In embodiments, a means of securing the bidirectional communication can comprise an authentication function and/or an encryption function. The control module 16 can then be designed to allow a temporally and/or locally limited agreement of certificates for securing communication.

In this concept, in embodiments, direct communication between mobile radio terminal devices or control modules is possible, which are, for example, also referred to as device-to-device (D2D) communication. Related extensions to communication between vehicles are known from standardization. One example is the 3GPP V2V (from vehicle-to-vehicle) communication as part of the C-V2X standard with the PC5 interface or also car-to-car communication with the 802.11p interface. In embodiments, one of these systems can be used and the communication module 10 or its transmitter 12 and receiver 14 and control module 16 can be adapted accordingly. This applies analogously to the mobile radio device 20 with its components.

FIG. 2 shows, as a block diagram, an embodiment of a method 300 for a communication module 10 for authenticating a mobile radio device 20 for a location-specific function of a parked vehicle 100, comprising the following steps: converting 310 a transmitter 12 of the communication module 10 from a first mode to a second mode, the transmitter 12 consuming less energy in the second mode than in the first mode; receiving 320 a mobile radio signal from the mobile radio device 20 which comprises information about an identity of the mobile radio device 20; authenticating 330 the mobile radio device 20 on the basis of the mobile radio signal.

FIG. 3 is a block diagram of an embodiment of a method 400 for a mobile radio device 20, which is designed to authenticate the mobile radio device 20 in a communication module 10 for a location-specific function of a parked vehicle 100, comprising the following steps: transmitting 410 a signal to the communication module 10 for the parked vehicle with information about an identity of the mobile radio device 20, wherein the information about the identity of the mobile radio device 20 is provided for authentication of the mobile radio device 20 by the communication module 10; receiving 420 a signal from the communication module 10 in the case of positive authentication of the mobile radio device 20 with information from at least one location-specific function of the vehicle 100.

It is expected that, from around 2019 on, vehicles will have a corresponding communication unit that, in addition to eCall (emergency call), also has the functionality C-V2X or later 5G (5th generation of cellular mobile communications) C-V2X. The current implementation of direct communication functions without detours via additional network components of the mobile radio network aims to increase traffic safety, efficiency, or comfort in vehicles in motion, see ETSI (European Standards Organization) TR102.638 or C-IST (Cooperative Intelligent Transport Systems) report of the EU. The focus is on direct vehicle-to-vehicle communication V2V or vehicle-to-infrastructure communication V2I. The scope of functions can be increased by expanding the communication system C-V2X based on the 3GPP standard after release 14. The following must be observed:

The V2X implementation in the vehicle contains a device for the secure storage of access information (secure element) and for the identification of authenticated exchange of information. This system is expanded so that the vehicle manufacturer can add identification information of the vehicle owner/user himself, for example in a personal mode of the existing C-V2X modem. This identification information can also be stored in mobile radio terminal devices. In this personal mode, manufacturer-specific functions can be arranged according to embodiments that go beyond the standardized C-V2X functional scope, or use the functions with partners other than those provided in the standard.

Accordingly, according to embodiments, the named identification can also be used with other devices before an authenticated exchange of information, for example with commercially available mobile radio devices for cellular mobile radio, on which applications from the vehicle manufacturer are executed. This information can be assigned to the driver, which information in particular comprises the identification data. This also allows the driver to be authenticated.

This access information can only be used for the services of the stationary vehicle in which the known C-V2X standard is inoperative. Correspondingly, the above-mentioned personal mode of the C-V2X modem, which is also called standby mode or inactive mode or vehicle that is not parked, can be geared towards a stationary vehicle, i.e., a parked vehicle. The access information for services offered when the vehicle is stationary is controlled by the vehicle manufacturer, for example Audi, using its own backend. This backend can be designed as a server operated by the vehicle manufacturer.

In embodiments, the communication module 10 can be designed to update stored data for authentication via a geographically remote central unit. In embodiments, the data can be stored in a security module.

A security module used for storage can, in embodiments, be referred to as an internal or external device for the efficient and secure execution of cryptographic operations or applications. This makes it possible, for example, to ensure the trustworthiness and integrity of data and the information associated with it. In order to ensure trustworthiness, it may be necessary to protect the cryptographic keys used both in terms of software and against physical attacks or side-channel attacks.

In normal operation of the V2X (vehicle-to-everything) implementation in the vehicle, also known as active mode, vehicle information (position, speed, vehicle settings) is regularly distributed via a broadcast system when the vehicle moves, and incoming broadcast information of other users of the V2X system is received. The normal C-V2X mode of the C-V2X modem is used for this.

To this end, in embodiments, the control module 16 of the communication module 10 can be designed to evaluate vehicle-specific and traffic-specific information from other entities when the vehicle 100 is not parked and/or to initiate the transmission of its own corresponding information.

Furthermore, the control module 16 of the communication module 10 can be designed in embodiments to transmit and receive the vehicle-specific and traffic-specific information according to the vehicle-to-everything (V2X) standard.

In addition, in embodiments, the control module 16 of the communication module 10 can be designed to convert the transmitter 12 from the second mode 630 to the first mode 600 when the vehicle 100 is not parked. The transmitter 12 has a particularly high power consumption and is therefore operated in the standby mode in a power-saving manner, as will be explained in more detail later.

The V2X system in the vehicle is converted from normal operation (active mode, moving vehicle, regular transmitting of V2X messages (CAM (Cooperative Awareness Message), DENM (Decentralized Notification Messages)), reception of broadcast messages) to standby mode (reception of information by authenticated user; transmitting function only after authentication). This switching includes the recognition of the vehicle status (e.g., ignition off, standstill) as well as switching to a reception mode/personal mode/standby mode to reduce power consumption, as well as activating the personal mode in order to only react to authenticated messages from the user.

Correspondingly, in embodiments, the transmitter 12 in the parked vehicle can be converted from the second mode to the first mode after successful authentication. While the receiver is at least regularly in operation for receiving an approved mobile device identification, the transmitter can be operated in a power-saving manner during this time, and in embodiments can even be switched off.

Furthermore, in embodiments, the control module 16 of the communication module 10 can be designed to at least temporarily switch the transmitter 12 to the second mode or to switch the transmitter 12 permanently to the second mode when parking the vehicle 100. The transmitter is the main power consumer of the communication module.

In addition, in embodiments in the parked vehicle, the control module 16 of the communication module 10 can be designed to receive the mobile radio signal in accordance with a vehicle-to-everything (V2X) standard.

Furthermore, in the parked vehicle, the control module 16 of the communication module 10 can be designed in embodiments in order to receive the information about the identity of the mobile radio device 20 based on the vehicle-to-person (V2P) standard.

In this way, the standard components of the C-V2X unit can continue to be used in their usual operating mode, only that they are assigned to the manufacturer-specific application on commercially available mobile radio devices in standby mode or in standby operation. It is expected of these that in the near future they will be able to communicate in the vehicle-to-person (V2P) standard for the participation of their users in road traffic.

Furthermore, in embodiments, the control module 16 of the communication module 10 can be designed to detect the parked state of the vehicle 100 on the basis of information relating to a lock, an empty driver's seat, a switched off ignition, or a standstill of the vehicle 100.

A number of functions are available as functions for the driver when approaching or leaving the vehicle. These include the detection of the distancing of the authenticated user. This can be done via GNSS (Global Navigation Satellite System) or via the system itself since time synchronization is part of the V2X system. In this way, location-specific functions can be implemented which include the welcome light, welcome tone, goodbye light/tone, reporting information and more.

Correspondingly, in embodiments, the at least one location-specific function can correspond to at least one or more elements of the group of welcome light, welcome tone, goodbye light, goodbye tone, access authorization, door opening and provision of reporting information.

Furthermore, in embodiments, the control module 16 of the communication module 10 can be designed to determine a distance between the vehicle 100 and the mobile radio device 20 before a location-specific function of the vehicle 100 is carried out. In addition, it can be provided in embodiments that the location-specific function of the vehicle is only enabled when the distance between vehicle 100 and mobile radio device 20 falls below a specified level.

In order to increase the confidentiality and the efficiency of the frequency usage, the radio transmission of the signals can also be replaced by point-to-point communication, which is sufficient for the present embodiments.

Correspondingly, in embodiments, the control module 16 of the communication module 10 can be designed to use a point-to-point transmission for the mobile radio signal between the communication module 10 and the mobile radio device 20.

Furthermore, in embodiments, the control module 16 of the communication module 10 can be designed to extract a geographic position of the vehicle 100 from the information received from at least one location-specific function of the vehicle 100.

Personal terminal device with the capability of P2V (pedestrian-to-vehicle) communication (through the corresponding chipset) will be available on the market from 2019 on. These are extended by a manufacturer application, for example from Audi, to include the personal mode function for V2X communication. This application can initiate an extensive exchange of information with the vehicle.

Accordingly, in embodiments, the control module 26 of the mobile radio device 20 can be designed to extract a request for the transmission of access authorization data to the communication module 10 from the information received from at least one location-specific function of the vehicle 100.

An embodiment further relates to a computer program with a program code for performing at least one of the named methods when the program code is executed on a computer, a processor, a control module, or a programmable hardware component. Embodiments also provide a digital storage medium that is machine-readable or computer-readable and that has electronically readable control signals that can interact with a programmable hardware component in such a way that one of the methods described above is carried out.

FIG. 4 shows a further embodiment of a communication device 500 with connected transceivers for local devices, which are designed as a GPS module 540, a Bluetooth module 550, and a WLAN module 560. The connection to the communication device 500 is established via a connection system 530 (interconnect system), which can be designed, for example, as an internal bus system.

The communication device 500 comprises a transceiver 510 (Cellular RF (Radio Frequency) Receiver) for transmitting and receiving radio signals according to the standards and frequency bands of the 2nd to the 5th generation of cellular mobile communications. This comprises the transmitter 12 and receiver 14 of FIG. 1. The transceiver 510 is coupled to a C-V2X modem 522, which comprises a memory and a processor (MCU) for processing the transmission reception signals in accordance with the respective mobile radio standard. The C-V2X modem 522 corresponds to the communication module 10 of FIG. 1.

The C-V2X modem 522 is for its part coupled to a secure element 520 for the storage of security-relevant data that are protected against unauthorized reading. The C-V2X modem 522 is also coupled to the connection system 530. The transceiver 510 is further coupled to a modem 524 for processing signals in accordance with the standards of 2nd to the 5th generation of cellular mobile communications. The modem 524 comprises a digital signal processor (DSP), a further processor (MCU) and a memory. The communication device 500 also includes a SIM (Subscriber Identity Module) card 512 in the associated reader to support the communication functions, one or more display units 514 (LCDs), an external memory 516 (ext. mem) as well as a connection option for external devices 518 (peripherals). An application processor 526 comprises a plurality of processors (MCU) and storage devices (memory). It is coupled to the connection system 530. A power supply 528 is also coupled to the connection system 530.

The GPS module 540, the Bluetooth module 550 and the WLAN module 560 each include a memory, a processor (MCU) and a transceiver module according to the corresponding standard.

The arrows outline the new aspects of the embodiments. Starting from operation 570, new authentication information is introduced. According to operation 580, the vehicle status (parked or not parked) is recognized in embodiments and the C-V2X modem is configured accordingly, i.e., a distinction is made between the two modes: parked vehicle and non-parked vehicle. Thus, the system can be designed for the embodiments.

In a further embodiment, FIG. 5 shows a more detailed block diagram of an embodiment of the C-V2X modem. The block vehicle in motion 600 shows the operation when the vehicle is not parked. Here, broadcast signals 610 are sent and received, which are exchanged with other vehicles and/or with infrastructure devices. The C-V2X modem is configured to periodically transmit the vehicle status as a broadcast signal. For this purpose, the transmitter 12 is switched on. At the same time, the modem is configured for reception in order to receive and authenticate signals from adjacent vehicles or infrastructure.

If the parking of the vehicle is detected, in embodiments, the operation 580 triggers a reconfiguration 620 of the C-V2X modem to the C-V2X personal mode/parked vehicle 630 state. For this purpose, the events "vehicle is parked," "vehicle is not moving for a specific period of time," and/or "the ignition is switched off" can be used in embodiments.

In this C-V2X module personal mode 630, only communication with drivers approved by the vehicle or by the manufacturer is allowed 640 in embodiments. No signals are sent and data is only processed if the driver is authenticated. The data exchange takes place as a point-to-point data exchange. The transmitter is in a power-saving mode which, in embodiments, provides for the transmitter to be switched off completely.

In embodiments, the C-V2X modem is provided by the control module 16 in FIG. 1 and the C-V2X modem 522 in FIG. 4.

The features disclosed in the above description, the following claims, and the accompanying figures can be important and implemented both individually and in any combination for the realization of an embodiment in its various configurations.

Although some aspects have been described in connection with an apparatus, it goes without saying that these aspects also represent a description of the corresponding method, so that a block or a component of a device is also to be understood as a corresponding method step or as a feature of a method step. Analogously, aspects that have been described in connection with or as a method step also represent a description of a corresponding block or details or features of a corresponding apparatus.

Depending on the specific implementation requirements, embodiments can be implemented in hardware or in software. The implementation can be carried out using a digital storage medium, for example, a floppy disc, a DVD, a Blu-ray disc, a CD, a ROM, a PROM, an EPROM, an EEPROM or a FLASH memory, a hard drive or other magnetic or optical storage device, on which electronically readable control signals are stored, which can or do work together with a programmable hardware component, such that the respective method is carried out.

A programmable hardware component can be formed by a processor, a central processing unit (CPU), a graphics processing unit (GPU), a computer, a computer system, an application specific integrated circuit (ASIC), an integrated circuit (IC), a system on chip (SOC), a programmable logic cell or a field programmable gate array (FPGA).

The digital storage medium can therefore be machine or computer readable. Some embodiments thus include a data carrier that has electronically readable control signals that are able to interact with a programmable computer system or a programmable hardware component in such a way that one of the methods described herein is carried out. One embodiment is thus a data carrier (or a digital storage medium or a computer-readable medium) on which the program for carrying out one of the methods described herein is recorded.

In general, embodiments can be implemented as a program, firmware, computer program, or computer program product with a program code or as data, the program code or the data being effective to carry out one of the methods when the program runs on a processor or a programmable hardware component. The program code or the data can, for example, also be stored on a machine-readable carrier or data carrier. The program code or the data can be present as source code, machine code, or bytecode, as well as other intermediate code, among other things.

A further embodiment is also a data stream, a signal sequence, or a sequence of signals, which represents the program for performing one of the methods described herein. The data stream, the signal sequence or the sequence of signals can, for example, be configured to be transferred via a data communication connection, for example via the Internet or another network. Embodiments are thus also data-representing signal sequences which are suitable for transmission over a network or a data communication connection, the data representing the program.

A program according to an embodiment can implement one of the methods while it is being carried out, for example, by reading out memory locations or writing data or a plurality of data into them, which may result in switching operations or other operations in transistor structures, in amplifier structures or in other electrical, optical, magnetic, or components working according to another functional principle. Accordingly, data, values, sensor values, or other information can be detected, determined, or measured by a program by reading out a memory location. A program can therefore detect, determine, or measure quantities, values, measured quantities, and other information by reading out one or more memory locations, and by writing to one or more memory locations it can cause, initiate, or carry out an action and control other devices, machines, and components.

The embodiments described above merely represent an illustration of the principles described here. It is understood that modifications and variations of the arrangements and details described herein will become apparent to another person skilled in the art. It is therefore intended that the scope of protection of the following claims is relevant and not limited by specific details presented herein with reference to the description and explanation of the embodiments.

LIST OF REFERENCE SIGNS

10 Communication module
12 Transmitter
14 Receiver
14 Control module
20 Control component
22 Transmitter
24 Receiver
24 Control module
100 Vehicle
110 Converting from a first mode to a second mode
120 Receiving a mobile radio signal
130 Authenticating a mobile radio device
200 Mobile station
300 Method for a communication module
310 Converting from a first mode to a second mode
320 Receiving a mobile radio signal
330 Authenticating a mobile radio device
400 Method for a mobile radio device
410 Transmitting a signal
420 Receiving a signal
500 Communication device
510 Transceiver
512 SIM card
514 Display
516 External memory
518 Connection for external devices 520 Secure element
522 C-V2X modem
524 2nd to 5th G modem
526 Application processor
528 Power supply
530 Connection system
540 GPS module
550 Bluetooth module
560 WLAN module
600 Moving vehicle in C-V2X modem mode
610 Exchange broadcast signals
620 Re-configuration
630 Parked vehicle in C-V2X modem mode
640 Point-to-point signal exchange

The invention claimed is:

1. A communication module for authenticating a mobile radio device for a location-specific function of a vehicle, the communication module comprising:
 a transmitter configured to transmit first mobile radio signals in a mobile radio system;
 a receiver configured to receive second mobile radio signals in the mobile radio system; and
 a control module for controlling the transmitter and the receiver, wherein the control module is coupled to the transmitter and the receiver, and wherein the control module is configured to:
 determine that the vehicle is parked;
 convert the transmitter from a first mode to a second mode, wherein the transmitter consumes less energy in the second mode than in the first mode;
 evaluate the second mobile radio signals, wherein the second mobile radio signals comprise information of an identity of the mobile radio device;
 authenticate the mobile radio device based on the second mobile radio signals, wherein the mobile radio device is authorized to use at least one location-specific function of the vehicle upon a successful authentication; and
 upon authenticating the mobile radio device, convert the transmitter from the second mode to the first mode.

2. The communication module according to claim 1, wherein the communication module is further configured to:
 determine that the vehicle is not parked; and
 in response to the determining, evaluate vehicle-specific and traffic-specific information from other entities and/or initiate the transmission of its own corresponding information.

3. The communication module according to claim 2, wherein the control module is further configured to transmit and receive the vehicle-specific and traffic-specific information according to a vehicle-to-everything (V2X) standard.

4. The communication module according to claim 1, wherein the control module is further configured to:
 determine that the vehicle is not parked; and
 in response to determining that the vehicle is not parked, convert the transmitter from the second mode to the first mode.

5. The communication module according to claim 1, wherein the control module is further configured to:
 determine that a distance between the vehicle and the mobile radio device falls below a specific limit; and
 in response to determining that a distance between the vehicle and the mobile radio device falls below the specific limit, carry out the at least one location-specific function of the vehicle.

6. The communication module according to claim 1, wherein the control module is further configured to use a point-to-point transmission for the first mobile radio signals and the second mobile radio signals between the communication module and the mobile radio device.

7. The communication module according to claim 1, wherein the vehicle comprises the communication module.

8. The communication module according to claim 1, wherein the communication module and the mobile radio device are in a system.

9. A mobile radio device for communicating with a communication module of a parked vehicle, comprising:
 a transmitter configured to transmit first mobile radio signals in a mobile radio system;
 a receiver configured to receive second mobile radio signals in the mobile radio system;
 a control module for controlling the transmitter and the receiver, wherein the control module is coupled to the transmitter and the receiver, and wherein the control module is configured to:
 transmit a point-to-point signal to the communication module, wherein the point-to-point signal comprises first information about an identity of the mobile radio device, and wherein the identity of the mobile radio device is provided for an authentication of the mobile radio device by the communication module;
 receive second information corresponding to at least one location specific function of the parked vehicle from the communication module of the parked vehicle;
 extract a positive authentication of the mobile radio device from the second information;
 extract a request for a transmission of access authorization data to the communication module from the second information; and
 transmit presets to the communication module based on the extracted request,
 wherein the presets indicate precluding the at least one location-specific function of the parked vehicle, and
 wherein the at least one location specific function includes opening a door of the parked vehicle, and
 wherein the identity of the mobile radio device is associated to a driver, which allows an authentication of the driver.

10. The mobile radio device according to claim 9, wherein the control module is configured to determine a geographical position of the parked vehicle based on the second information corresponding to the at least one location-specific function of the parked vehicle.

11. The mobile radio device according to claim 9, wherein the control module is further configured to extract, from the second information corresponding to the at least one location-specific function of the parked vehicle, a request for a transmission of access authorization data to the communication module.

12. A method for a communication module for authenticating a mobile radio device for a location-specific function of a parked vehicle, the method comprising:
 converting a transmitter of the communication module from a first mode to a second mode, wherein the transmitter consumes less energy in the second mode than in the first mode;
 receiving a mobile radio signal from the mobile radio device, wherein the mobile radio signal comprises information about an identity of the mobile radio device;
 authenticating the mobile radio device based on the mobile radio signal; and upon authenticating the mobile radio device, converting the transmitter from the second mode to the first mode.

13. The method of claim 12, wherein the method is performed by a program code of a computer program of a non-transitory computer-readable medium that is executed on a computer, a processor, a control module, or a programmable hardware component.

14. A method for a mobile radio device, the method comprising:
- transmitting a point-to-point signal to a communication module, wherein the point-to-point signal comprises first information about an identity of the mobile radio device, and wherein the identity of the mobile radio device is provided for an authentication of the mobile radio device by the communication module;
- receiving second information corresponding to at least one location specific function of a parked vehicle from the communication module of the parked vehicle;
- extracting a positive authentication of the mobile radio device from the second information;
- extracting a request for a transmission of access authorization data to the communication module from the second information; and
- transmitting presets to the communication module based on the extracted request,
- wherein the presets indicate precluding the at least one location specific function of the parked vehicle, and
- wherein the at least one location-specific function includes opening a door of the parked vehicle, and
- wherein the identity of the mobile radio device is associated to a driver, which allows an authentication of the driver.

* * * * *